United States Patent
Huang et al.

(10) Patent No.: US 10,274,305 B2
(45) Date of Patent: Apr. 30, 2019

(54) LAMINATION TYPE STRETCH SENSOR FOR MAKING DIFFERENT LAYERS GENERATES DISPLACEMENT ALONG DIFFERENT DIRECTIONS WHEN STRETCHED

(71) Applicant: TAIWAN ALPHA ELECTRONIC CO., LTD., Taoyuan (TW)

(72) Inventors: Tzu-Hsuan Huang, Taoyuan (TW); Wei-Liang Liu, Taoyuan (TW)

(73) Assignee: TAIWAN ALPHA ELECTRONIC CO., LTD., Taoyuan (TW)

( * ) Notice: Subject to any disclaimer, the term of this patent is extended or adjusted under 35 U.S.C. 154(b) by 70 days.

(21) Appl. No.: 15/443,110

(22) Filed: Feb. 27, 2017

(65) Prior Publication Data
US 2018/0188015 A1  Jul. 5, 2018

(30) Foreign Application Priority Data
Dec. 29, 2016  (TW) .............................. 105143777 A

(51) Int. Cl.
*G01B 7/16* (2006.01)
*G01B 7/30* (2006.01)
(Continued)

(52) U.S. Cl.
CPC .................. *G01B 7/22* (2013.01); *G01L 1/14* (2013.01); *G06F 3/011* (2013.01)

(58) Field of Classification Search
CPC ... G01B 7/16; G01B 7/22; G01B 7/30; G01R 27/26; G01D 5/16; H05K 1/02; H05K 1/11
See application file for complete search history.

(56) References Cited

U.S. PATENT DOCUMENTS 5,610,528 A * 3/1997 Neely .................. A61B 5/1071
324/660
2009/0015270 A1* 1/2009 Hayakawa .............. G01L 1/142
324/686
(Continued)

FOREIGN PATENT DOCUMENTS

| CN | 105865536 A | 8/2016 | |
|---|---|---|---|
| TW | 201418686 A | 5/2014 | |
| WO | WO2018003527 | * 7/2016 | ............... G01B 7/16 |

*Primary Examiner* — Neel D Shah
(74) *Attorney, Agent, or Firm* — Muncy, Geissler, Olds & Lowe, P.C.

(57) ABSTRACT

A lamination type stretch sensor includes a first elastic insulating layer, a first elastic conductive layer, an elastic dielectric layer, a second elastic conductive layer and a second elastic insulating layer sequentially piled together thereon. The first elastic conductive layer includes a plurality of first coupling sections and a plurality of first connecting sections. The second elastic conductive layer includes a plurality of second coupling sections and a plurality of second connecting sections disposed between the second coupling sections. The elastic dielectric layer is deposited between the first elastic conductive layer and the second elastic conductive layer. When the composite lamination type stretch sensor is stretched, the first elastic conductive layer and the second elastic conductive layer respectively generate displacements along different directions to make the coupling ratio between the first coupling sections and the second coupling sections varies simultaneously to accordingly obtain a corresponding capacity, so as to determine the deformation of the lamination type stretch sensor in accordance with the corresponding capacity.

10 Claims, 8 Drawing Sheets

(51) Int. Cl.
*G01R 27/26* (2006.01)
*G01D 5/16* (2006.01)
*H05K 1/02* (2006.01)
*H05K 1/11* (2006.01)
*G01L 1/14* (2006.01)
*G06F 3/01* (2006.01)

(56) References Cited

U.S. PATENT DOCUMENTS

2014/0035603 A1 2/2014 Ray
2016/0018275 A1* 1/2016 Kaneko .................... G01B 1/00
 73/862.626
2016/0231098 A1* 8/2016 Otaka ..................... G06F 3/044

* cited by examiner

LAMINATION TYPE STRETCH SENSOR FOR MAKING DIFFERENT LAYERS GENERATES DISPLACEMENT ALONG DIFFERENT DIRECTIONS WHEN STRETCHED

This application claims the benefit of Taiwan Patent Application Serial No. 105143777, filed Dec. 29, 2016, the subject matter of which is incorporated herein by reference.

BACKGROUND OF INVENTION

1. Field of the Invention

The present invention is related to a stretch sensor, and more particularly is related to a lamination type stretch sensor with multiple stretchable layers generating displacements along different directions when being stretched.

2. Description of the Prior Art

In the field of human-computer interaction (HCI), it is common to operate the wearable devices, as a portion of the user, by tracking the body movement of the user. Such technology is helpful for integrating the wearable devices into our daily lives and our daily lives would be more convenient by using the functions provided by the wearable devices.

Because the body movements of the users are detected by the sensors disposed on the wearable devices, these sensors must have flexibility and stretchability for detecting different body movements such as bending or stretching.

The conventional technology uses an elastic body with two electrodes located on the opposite sides thereof to form a stretchable sensor. A capacitor is formed between the two electrodes on the opposite sides of the elastic body, the induced capacitance would be changed when the elastic body is stretched to reduce the distance between the two electrodes such that the stretch deformation can be calculated. Although the aforementioned technology is capable to detect stretch deformation, such sensor does not have enough sensibility to detect subtle change of stretching because the sensor needs a certain stretch deformation to generate a significant change of distance between the two electrodes for showing a detectable capacitive change.

SUMMARY OF THE INVENTION

In view of the conventional sensor, which has two electrodes located on two sides of an elastic body and the distance between the two electrodes would be reduced to change the capacitance between the two electrodes when the elastic body is stretched, it is common to have the problem that the sensor cannot be used to detect subtle movement because the change of the induced capacitance is not obvious for a small stretching. Accordingly, it is an object of the present invention to provide a lamination type stretch sensor, which has multiple stretchable layers with different stretching direction so as to increase the change of induced capacitance between the two electrodes for a given stretching.

In accordance with the aforementioned object, a lamination type stretch sensor is provided. The lamination type stretch sensor comprises a first elastic insulation layer, a first elastic conductive layer, an elastic dielectric layer, a second elastic conductive layer, and a second elastic insulating layer.

The first elastic insulation layer includes a first connecting portion and a first stretching end portion. The first stretching end portion is integrally extended from the first connecting portion along a first direction.

The first elastic conductive layer is located on the first connecting portion and comprises a plurality of first coupling sections and a plurality of first connecting sections. These first coupling sections are spaced apart with each other and these first connecting sections are located between these first coupling sections for electrically connecting these first coupling sections. Preferably, these first connecting sections are alternatively located on both sides of these first coupling sections. In addition, these first coupling sections are spaced apart with each other in a first interval, each of these first coupling sections has a first width, and a ratio of the first width and the first interval is 1.67.

The elastic dielectric layer is located on the first connecting portion and covers the first elastic conductive layer. Wherein, the elastic dielectric layer is composed of materials comprising an elastic resin and a dielectric material. The elastic resin is composed of materials at least comprising Monovinyl terminated polydimethylsiloxane Vinyl modified Q silica resin, and Methylhydrosiloxane-dimethylsiloxane copolymer, trimethylsiloxane terminated. The dielectric material is composed of materials at least comprising a $Sr_{1-x}Ca_xTiO_3$ compound, a $Sr_{1-y}Ba_yTiO_3$ compound, or a $BaTiO_3$ compound, wherein $0.1 \leq x \leq 0.9$ and $0.1 \leq y \leq 0.9$, such that dielectric constant (K) of the dielectric material is ranged between 14 and 8000, and dielectric constant (K) of the elastic dielectric layer is ranged between 4.85 and 300. Preferably, the dielectric material is composed of the $Sr_{1-x}Ca_xTiO_3$ compound, and the dielectric constant of the dielectric material is ranged between 14 and 30, and the elastic dielectric layer comprises 10 wt % to 20 wt % the dielectric material.

The second elastic conductive layer is located on the elastic dielectric layer and is separated from the first elastic conductive layer by the elastic dielectric layer. The second elastic conductive layer comprises a plurality of second coupling sections and a plurality of second connecting sections. The second coupling sections corresponding to the first coupling sections are spaced apart with each other. A total initial coupling capacitance is generated between these first coupling sections and the second coupling sections. The second connecting sections are located between these second coupling sections for electrically connecting these second coupling sections. Preferably, these second connecting sections are alternatively located on both sides of these second coupling sections, and these first connecting sections and these second connecting sections are arrayed alternatively. In addition, these second coupling sections are spaced apart with each other in a second interval, each of these second coupling sections has a second width, and a ratio of the second width and the second interval is 1.67.

The second elastic insulation layer has a second connecting portion and a second stretching end portion. The second connecting portion is located on the elastic dielectric layer and covers the second elastic conductive layer. The second stretching end portion is integrally extended from the second connecting portion along a second direction, which is opposite to the first direction.

Wherein, when the first stretching end portion and the second stretching end portion are stretched along the first direction and the second direction respectively to stretch the lamination type stretch sensor to a stretched length, these first coupling sections and these second coupling sections move along the first direction and the second direction respectively so as to form a total stretched coupling capacitance corresponding to the stretched length, and the total stretched coupling capacitance is smaller than the total initial coupling capacitance.

As mentioned, because the lamination type stretch sensor provided in accordance with the present invention has the first elastic conductive layer and the second elastic conductive layer on the two sides of the elastic dielectric layer respectively, the plurality of first coupling sections of the first elastic conductive layer and the plurality of second coupling sections of the second elastic conductive layer may induce a total initial coupling capacitance. When the first stretching end portion and the second stretching end portion are stretched along the first direction and the second direction respectively, these first coupling sections and these second coupling sections will move along the first direction and the second direction respectively so as to form a total stretched coupling capacitance corresponding to the stretched length. Thereby, the user may calculate the stretch of the lamination type stretch sensor by comparing the total initial coupling capacitance and total stretched coupling capacitance.

BRIEF DESCRIPTION OF THE DRAWINGS

The present invention will now be specified with reference to its preferred embodiment illustrated in the drawings, in which.

DESCRIPTION OF THE PREFERRED EMBODIMENT

Figure 1:
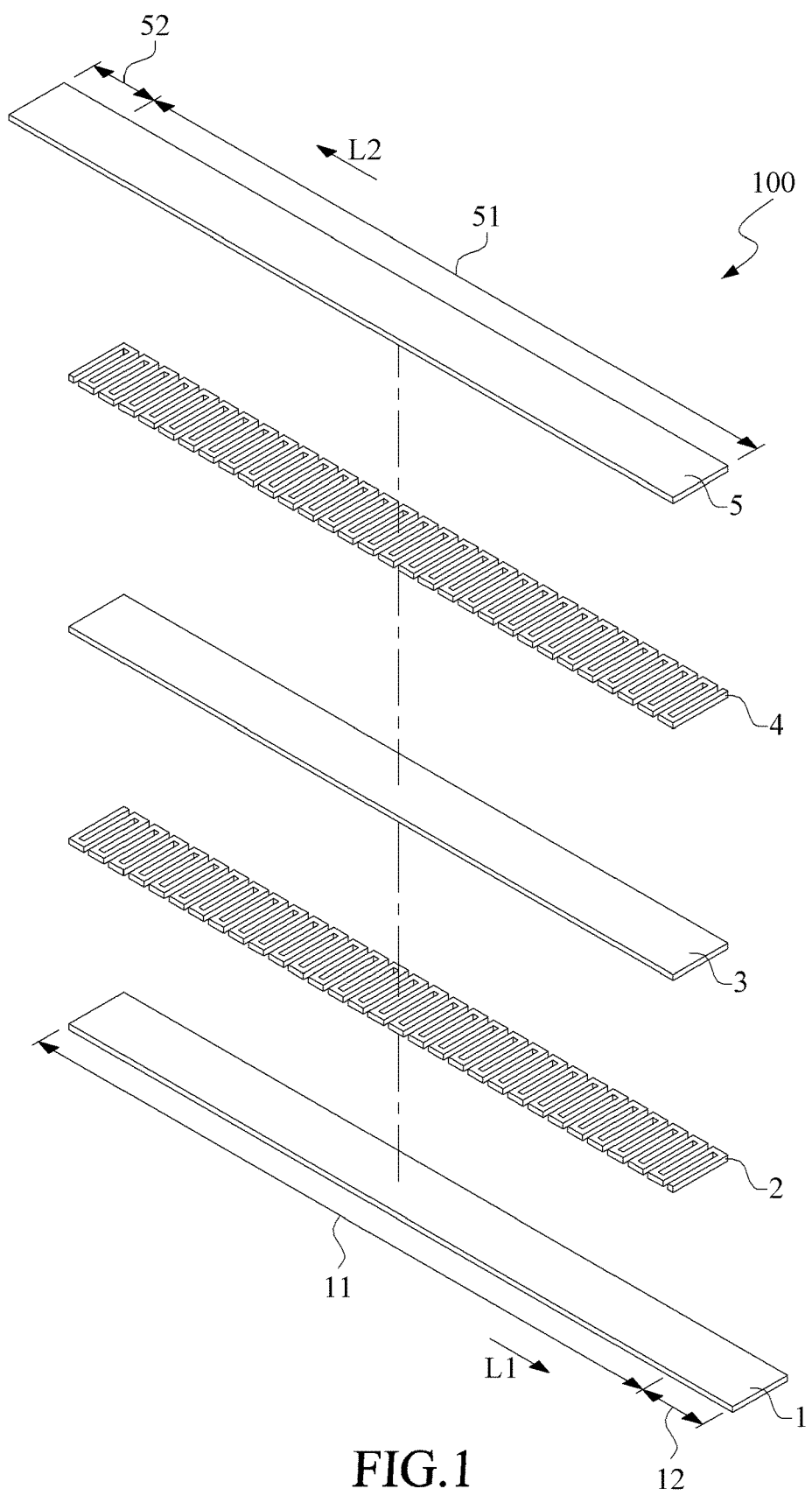
FIG. 1 is a 3D explosive view of a lamination type stretch sensor provided in accordance with a preferred embodiment of the present invention.

The present invention will now be specified with reference to its preferred embodiment illustrated in the drawings to further clarify the advantage and the feature of the present invention. In should be mentioned that these figures are merely schematic views rather than the exact dimension of the illustrated devices and are merely for the purpose of illustration and explanation of the embodiments of the present invention.

Figure 2:
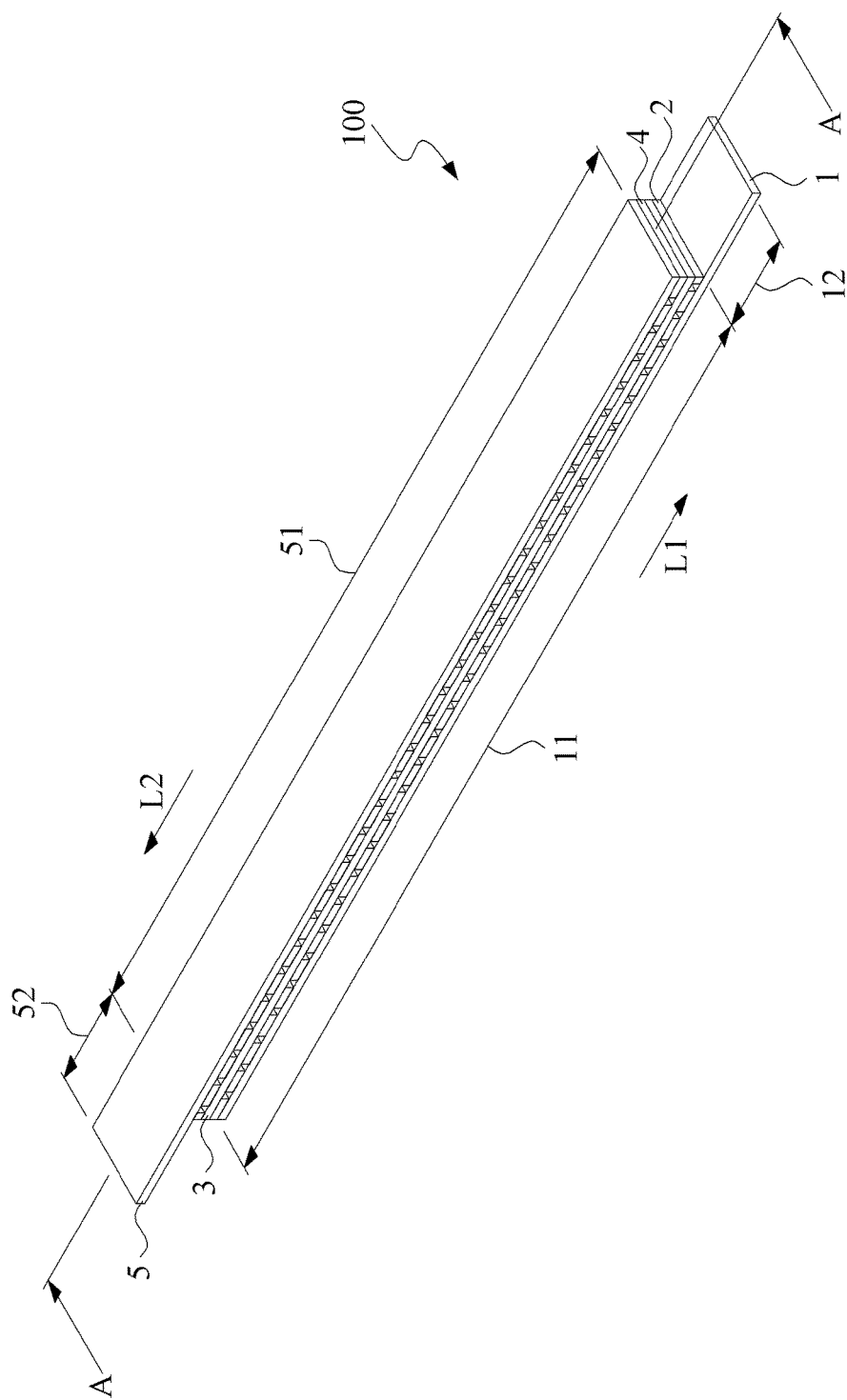
FIG. 2 is a 3D schematic view of a lamination type stretch sensor provided in accordance with a preferred embodiment of the present invention.

Please refer to FIG. 1 and FIG. 2, wherein FIG. 1 is a 3D explosive view of a lamination type stretch sensor provided in accordance with a preferred embodiment of the present invention, and FIG. 2 is a 3D schematic view of a lamination type stretch sensor provided in accordance with a preferred embodiment of the present invention. As shown, the lamination type stretch sensor 100 comprises a first elastic insulating layer 1, a first elastic conductive layer 2, an elastic dielectric layer 3, a second elastic conductive layer 4, and a second elastic insulating layer 5.

The first elastic insulating layer 1 has a first connecting portion 11 and a first stretching end portion 12. The first stretching end portion 12 is integrally extended from the first connecting portion 11 along a first direction L1.

Figure 3:
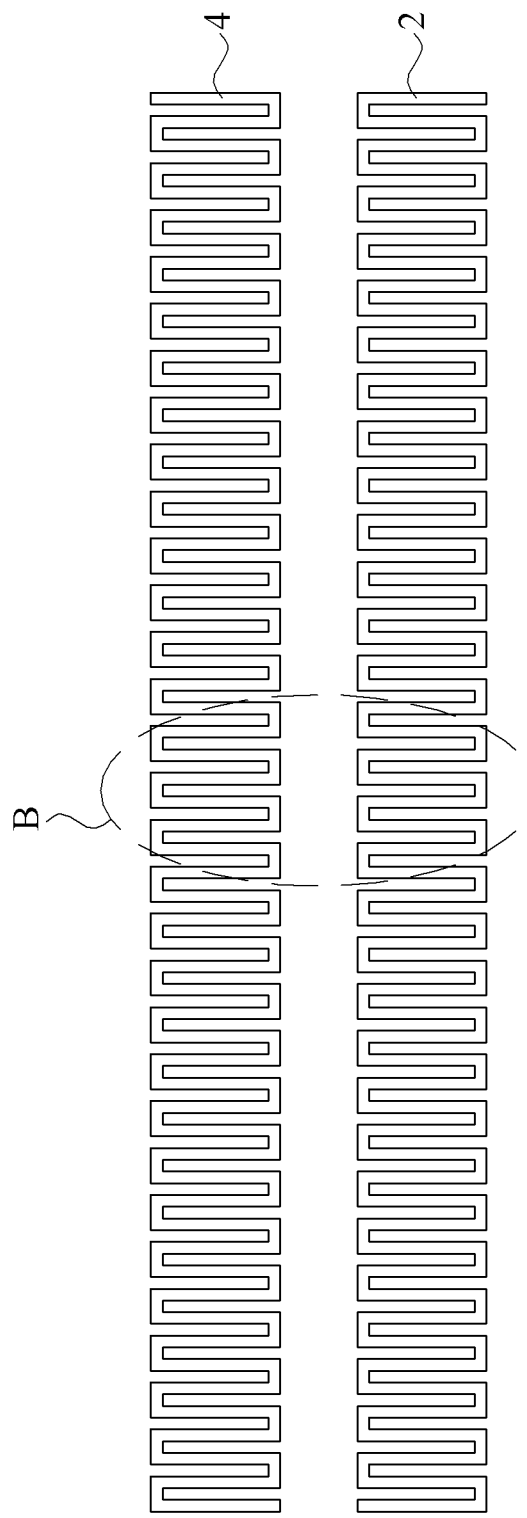
FIG. 3 is a plan view showing the first elastic conductive layer and the second elastic conductive layer.
Figure 4:
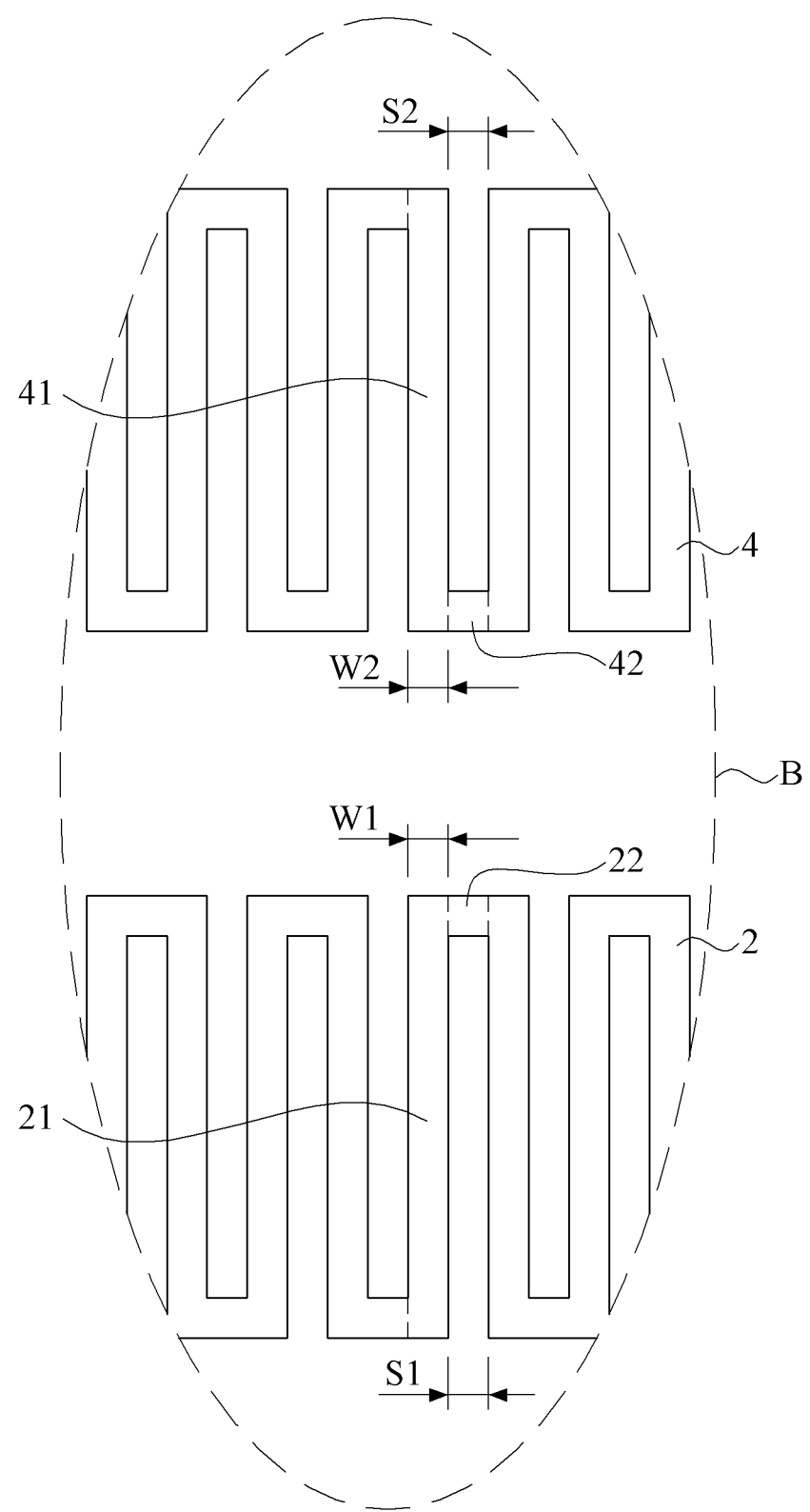
FIG. 4 is an enlarged view showing the portion B in FIG. 3.

Please also refer to FIG. 3 and FIG. 4, wherein FIG. 3 is a plan view showing the first elastic conductive layer and the second elastic conductive layer, and FIG. 4 is an enlarged view showing the portion B in FIG. 3. As shown, the first elastic conductive layer 2 is located on the first connecting portion 11 and comprises a plurality of first coupling sections 21 and a plurality of first connecting sections 22. These first coupling sections 21 are spaced apart with each other in a first interval S1, each of these first coupling sections 21 has a first width W1, and a ratio of the first width W1 and the first interval S1 is 1.67. In the present embodiment, the first width W1 of the first coupling section 21 is 0.5 mm, and the first interval S1 is 0.3 mm.

These first connecting sections 22 are located between these first coupling sections 21 and alternatively located on both sides of these first coupling sections 21 so as to have these first coupling sections 21 electrically connected with each other through the aforementioned first connecting sections 22.

The elastic dielectric layer 3 is located on the first connecting portion 11 and covers the first elastic conductive layer 2. Wherein, the elastic dielectric layer 3 is composed of materials comprising an elastic resin and a dielectric material.

In the present embodiment, the elastic resin is composed of materials at least comprising Monovinyl terminated polydimethylsiloxane (CAS No. 68951-99-5), Vinyl modified Q silica resin (CAS No. 68584-83-8), and Methylhydrosiloxane-dimethylsiloxane copolymer, trimethylsiloxane terminated (CAS No. 68037-59-2). The content of Monovinyl terminated polydimethylsiloxane in the elastic resin is greater than 70%, the content of Vinyl modified Q silica resin is less than 30%, and the content of Methylhydrosiloxane-dimethylsiloxane copolymer, trimethylsiloxane terminated is less than 10%. In the present embodiment, the elastic resin is composed of 75% Monovinyl terminated polydimethylsiloxane, 20% Vinyl modified Q silica resin, and 5% Methylhydrosiloxane-dimethylsiloxane copolymer, trimethylsiloxane terminated.

The dielectric material included in the elastic dielectric layer 3 is composed of materials at least comprising a $Sr_{1-x}Ca_xTiO_3$ compound, a $Sr_{1-y}Ba_yTiO_3$ compound, or a $BaTiO_3$ compound, wherein $0.1 \leq x \leq 0.9$ and $0.1 \leq y \leq 0.9$, such that dielectric constant (K) of the dielectric material would be ranged between 14 and 8000. If the dielectric material added into the elastic dielectric layer 3 is about 3.75 wt % to 20 wt %, the overall dielectric constant (K) of the elastic dielectric layer 3 would be ranged between 4.85 and 300.

The following table 1 shows the dielectric constant enhancement with respective to the amount of dielectric material being incorporated in the elastic dielectric layer 3, and the dielectric material in table 1 is composed of materials including the $Sr_{1-x}Ca_xTiO_3$ compound, but not including the $Sr_{1-y}Ba_yTiO_3$ compound or the $BaTiO_3$ compound. As shown in table 1, when x=0.1, dielectric constant of the dielectric material ($Sr_{0.9}Ca_{0.1}TiO_3$) is 30, when x=0.9, dielectric constant of the dielectric material ($Sr_{0.1}Ca_{0.9}TiO_3$) is 14. In addition, when the amount of the dielectric material incorporated in the elastic dielectric layer 3 is given, e.g. 10 wt % to 20 wt %, dielectric constant enhancement would be changed with respective to the x value of the dielectric compound $Sr_{1-x}Ca_xTiO_3$, such that the dielectric constant enhancement of the elastic dielectric layer 3 after incorporating 10 wt % to 20 wt % dielectric material may reach the value of 1.4 to 6.

TABLE 1

| Dielectric material ($Sr_{1-x}Ca_xTiO_3$ compound) | Dielectric constant | Amount of dielectric material | Dielectric constant of elastic dielectric layer |
|---|---|---|---|
| x = 0.1 | 30 | 10 wt % | 6.45 |
| x = 0.9 | 14 | 10 wt % | 4.85 |
| x = 0.1 | 30 | 20 wt % | 9.45 |
| x = 0.9 | 14 | 20 wt % | 6.25 |

As mentioned, if the dielectric constant of the elastic resin of the elastic dielectric layer 3 is 3.45, dielectric constant enhancement of the elastic dielectric layer 3 would be changed in responsive to the percentage of elastic resin and dielectric material ($Sr_{1-x}Ca_xTiO_3$, in which x=0.1 or 0.9). In addition, the composition of the dielectric material in the present embodiment may be replaced by the $Sr_{1-y}Ba_yTiO_3$ compound or the $BaTiO_3$ compound, for example, after incorporating 3.75 wt % $BaTiO_3$ compound in the elastic dielectric layer 3, the dielectric constant of the elastic dielectric layer 3 may reach the value of 300 (dielectric constant of the elastic resin is quite small and can be neglected).

Moreover, in accordance with another embodiment of the present invention, the dielectric material may be composed of the materials comprising both the $Sr_{1-y}Ba_yTiO_3$ compound and the $BaTiO_3$ compound. Dielectric constant of the $Sr_{1-y}Ba_yTiO_3$ compound is ranged between 1000 and 4000 when $0.1 \leq y \leq 0.9$, and dielectric constant of the $BaTiO_3$ compound is ranged between 3000 and 8000. Thereby, if both the dielectric constants of the $Sr_{1-y}Ba_yTiO_3$ compound and the BaTiO3 compound reach the maximum and the ratio of these two compounds in the dielectric material is 1:1, only 5 wt % the dielectric material is needed to enhance the dielectric constant of the elastic dielectric layer 3 to the value of 300 (dielectric constant of the elastic resin is quite small and can be neglected).

In addition to the abovementioned embodiments, in accordance with the other embodiments of the present invention, the dielectric material may be composed of the materials comprising both the $Sr_{1-x}Ca_xTiO_3$ compound and the $Sr_{1-y}Ba_yTiO_3$ compound, or comprising both the $Sr_{1-x}Ca_xTiO_3$ compound and the $BaTiO_3$ compound, or comprising the $Sr_{1-x}Ca_xTiO_3$ compound, the $Sr_{1-y}Ba_yTiO_3$ compound, and the $BaTiO_3$ compound.

The second elastic conductive layer 4 is located on the elastic dielectric layer 3 and separated from the first elastic conductive layer 2 by the elastic dielectric layer 3, and the second elastic conductive layer 4 comprises a plurality of second coupling sections 41 and a plurality of second connecting sections 42. These second coupling sections 41 are corresponding to the first coupling sections 21 and are spaced apart with each other. That is, the second coupling sections 41 and the first coupling sections 21 located on two sides of the elastic dielectric layer 3 are overlapped, and each second coupling section 41 is coupled to the corresponding first coupling section 21 which overlaps the second coupling section 41, such that an initial coupling capacitance is generated between the two corresponding coupling sections. Wherein these second coupling sections 41 are spaced apart with each other in a second interval S2, each of these second coupling sections 41 has a second width W2, and a ratio of the second width W2 and the second interval S2 is 1.67. In the present embodiment, the second width W2 of the second coupling section 41 is 0.5 mm, and the second interval S2 is 0.3 mm.

These second connecting sections 42 are located between these second coupling sections 41 respectively and alternatively located on both sides of these second coupling sections 41 for electrically connecting these second coupling sections 41. These first connecting sections 22 and these second connecting sections 42 are arrayed alternatively such that second elastic conductive layer 4 is coupled to the first elastic conductive layer 2 merely by the overlapping between the first coupling sections 21 and the second coupling sections 41.

As mentioned, in the present embodiment, the overlapping ratio of the first coupling section 21 and the corresponding second coupling section 41 must be greater than 10% for inducing capacitance. Each first coupling section 21 and the corresponding second coupling section 41 may generate an initial coupling capacitance, and the sum of these initial coupling capacitance is a total initial coupling capacitance.

The second elastic insulating layer 5 has a second connecting portion 51 and a second stretching end portion 52. The second connecting portion 51 is located on the elastic dielectric layer 3 and covers the second elastic conductive layer 4. The second stretching end portion 52 is integrally extended from the second connecting portion 51 along a second direction L2 which is opposite to the first direction L1.

Figure 5:
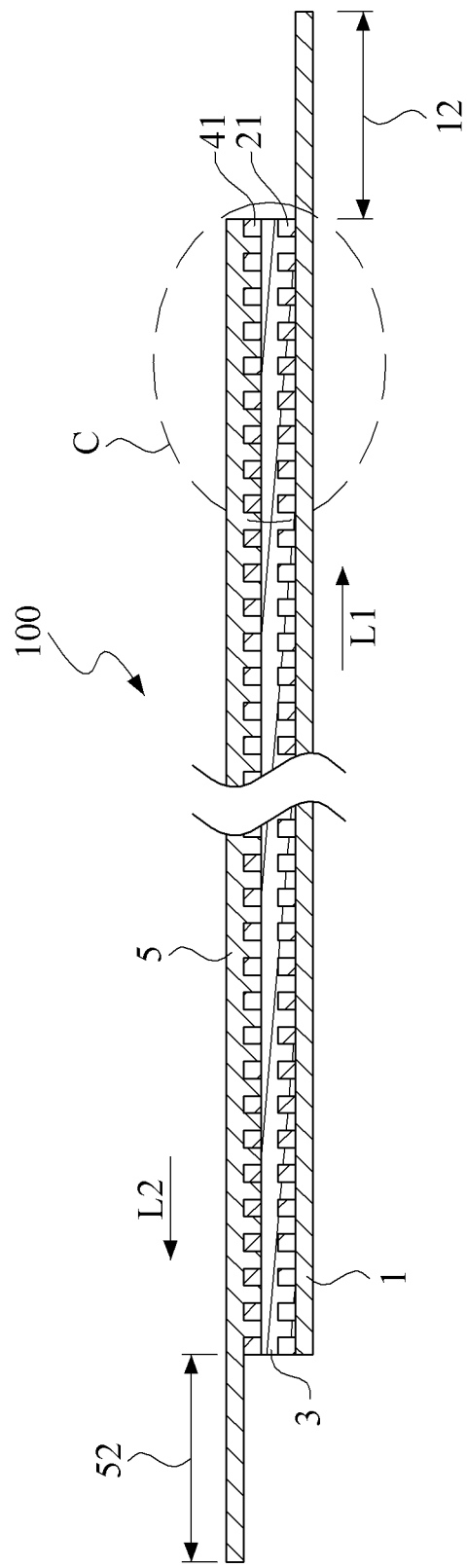
FIG. 5 is a cross-section view showing the A-A cross-section of FIG. 2.
Figure 6:
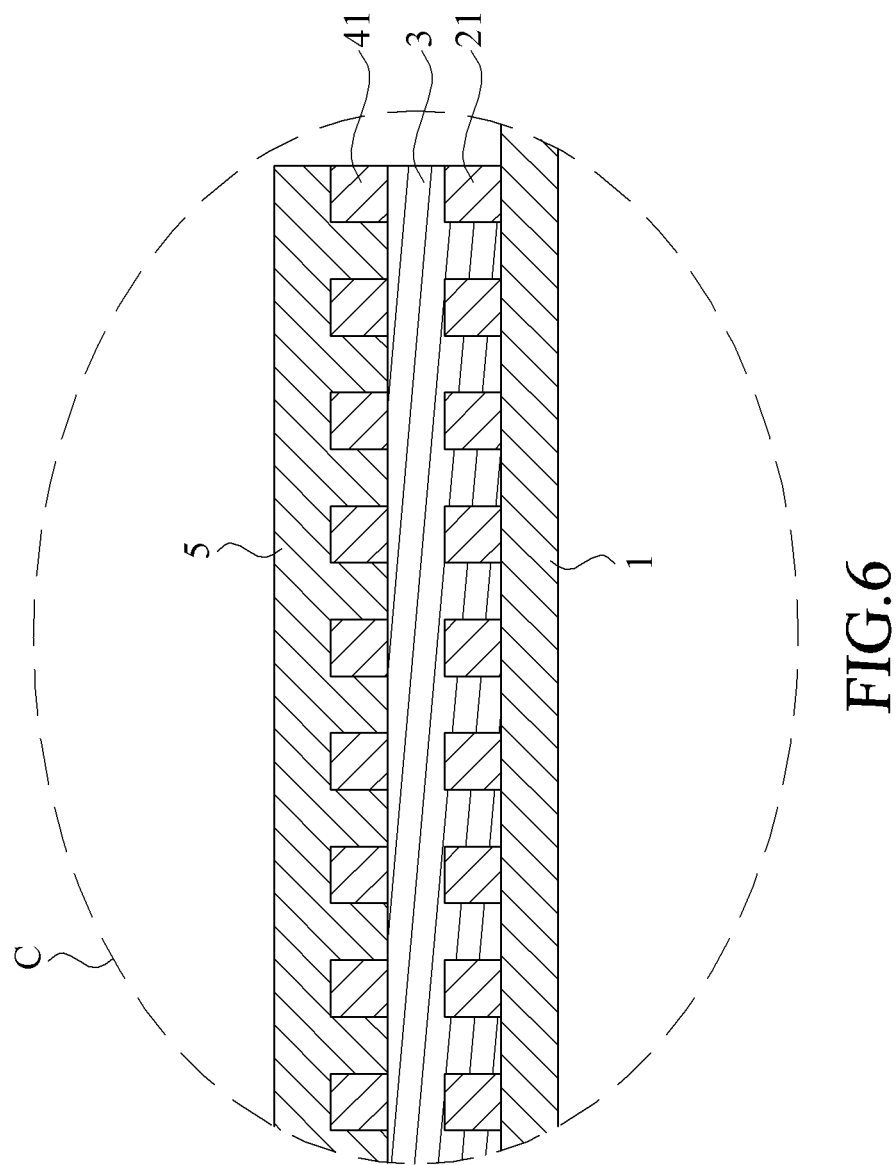
FIG. 6 is an enlarged view showing the portion C in FIG. 5.
Figure 7:
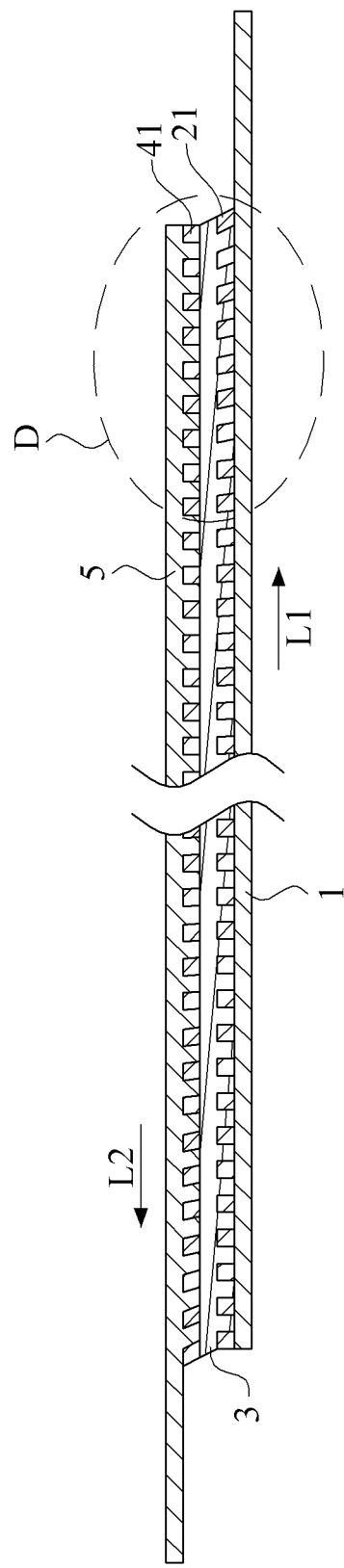
FIG. 7 is a cross-section view showing the lamination type stretch sensor of FIG. 5 when the sensor is stretched.
Figure 8:
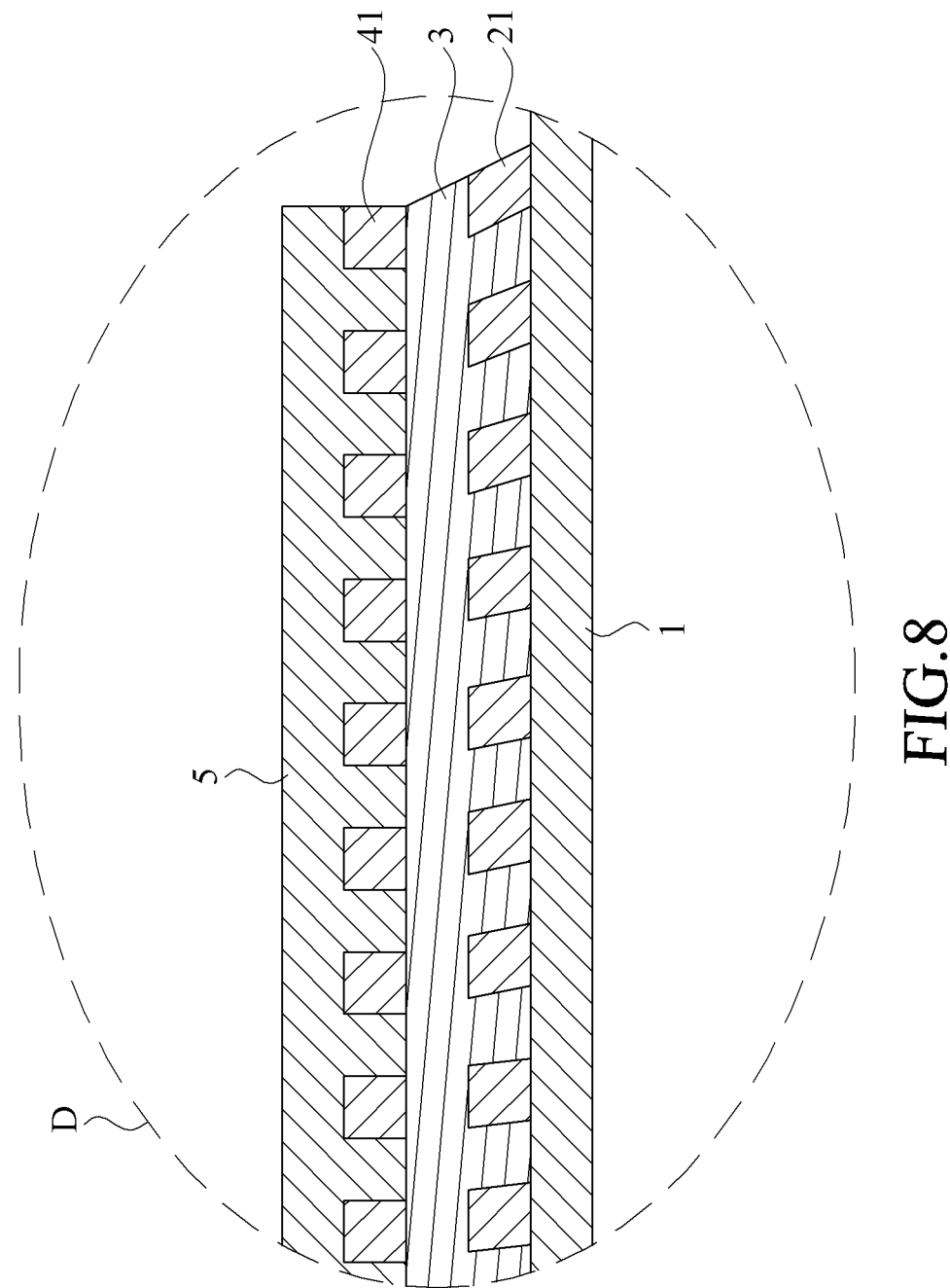
FIG. 8 is an enlarged view of the portion D in FIG. 7.

Please keep referring to FIG. 5 to FIG. 8, wherein FIG. 5 is a cross-section view showing the A-A cross-section of FIG. 2, FIG. 6 is an enlarged view showing the portion C in FIG. 5, FIG. 7 is a cross-section view showing the lamination type stretch sensor of FIG. 5 when the stretch sensor is stretched, and FIG. 8 is an enlarged view of the portion D in FIG. 7. Because the lamination of the lamination type stretch sensor 100 provided in the present embodiment is formed by printing and both the first elastic conductive layer 2 and the second elastic conductive layer 4 themselves may generate a lot of gaps, the materials for forming the elastic dielectric layer 3 and the second elastic insulating layer 5 may fills the gaps of the first elastic conductive layer 2 and the second elastic conductive layer 4 so as to form the stretch sensor as shown in FIG. 5 to FIG. 8. In contrast, FIG. 1 and FIG. 2 are merely simple schematic views showing the elements in the lamination type stretch sensor 100 and the correspondence thereof for indicating the model of FIG. 5 to FIG. 8.

As shown in FIG. 5 to FIG. 8, when the first stretching end portion 12 and the second stretching end portion 52 are stretched along the first direction L1 and the second direction L2 respectively to stretch the lamination type stretch sensor 100 to a stretched length, these first coupling sections 21 and these second coupling sections 41 are moved along the first direction L1 and the second direction L2 respectively so as to form a plurality of individual stretched coupling capacitance. The sum of these individual stretched coupling capacitance is a total stretched coupling capacitance corresponding to the stretched length, and the total stretched coupling capacitance is smaller than the total initial coupling capacitance.

As mentioned, in more detail, when the first elastic insulating layer 1 is stretched by stretching the first stretching end portion 12 along the first direction L1 and the second elastic insulating layer 5 is stretched by stretching the second stretching end portion 52 along the second direction L2, because the first elastic insulating layer 1 is connected to the second elastic insulating layer 5 through the elastic dielectric layer 3, the force applied to the first elastic insulating layer 1 and the second elastic insulating layer 5 would be also applied to the elastic dielectric layer 3, therefore, the elastic dielectric layer 3 will act as the base of the first elastic insulating layer 1 such that the first stretching end portion 12 receiving the stretching force directly may have a larger deformation and the first connecting portion 11 may have a relatively smaller deformation. That is, the deformation gradient of the first elastic insulating layer 1 increases from the first connecting portion 11 along the first direction L1 to the first stretching end portion 12, and correspondingly, the deformation gradient of the second elastic insulating layer 5 increases from the second connecting portion 51 along the second direction L2 to the second stretching end portion 52.

As mentioned, when the first elastic insulating layer 1 and the second elastic insulating layer 5 are elongated along the first direction L1 and the second direction L2 respectively, the first coupling section 21 and the second coupling section 41 close to the first stretching end portion 12 and the second stretching end portion 52 may have displacement first, and then as the stretching ratios of the first elastic insulating layer 1 and the second elastic insulating layer 5 increase, the first coupling section 21 and the second coupling section 41 away from the first stretching end portion 12 and the second stretching end portion 52 will be forced to move. That is, the displacement between the first coupling sections 21 and the corresponding second coupling sections 41 will increase from the two sides of the elastic dielectric layer 3 toward the center in responsive to the increasing stretching ratio of the first elastic insulating layer 1 and the second elastic insulating layer 5. Thereby, the user may compare the total stretched coupling capacitance with the total initial coupling capacitance before the lamination type stretch sensor is stretched to calculate the stretching deformation value of the lamination type stretch sensor 100.

In conclusion, in compared with the conventional sensor, which features the electrodes located on two sides of the elastic body such that the distance between the electrodes would be changed to generate the variations of the capacitance induced between the two electrodes when the elastic body is stretched, because the lamination type stretch sensor provided in accordance with the present invention has the first elastic conductive layer and the second elastic conductive layer separated by the elastic dielectric layer, when the first elastic insulating layer and the second elastic insulating layer are stretched along the first direction and the second direction respectively, the first elastic conductive layer and the second elastic conductive layer may be driven to show the displacements along the first direction and the second direction respectively so as to generate variations of the total coupling capacitance between the first elastic conductive layer and the second elastic conductive layer.

As mentioned, because the first elastic conductive layer and the second elastic conductive layer have a plurality of first coupling sections and a plurality of second coupling sections respectively, and the first elastic conductive layer and the second elastic conductive layer on the first elastic insulating layer and the second elastic insulating layer will have elastic deformation increasing along the first direction and the second direction respectively, by changing the number of coupling sections and the coupling ratio of the first coupling sections and the second coupling sections, even a small stretching can generate a meaningful change of total stretched coupling capacitance between the first elastic conductive layer and the second elastic conductive layer. Therefore, detecting sensibility regarding stretching deformation can be improved.

In addition, a plurality of lamination type stretch sensors provided in the present invention may be laminated for further improving detecting sensibility regarding stretching deformation.

While the present invention has been particularly shown and described with reference to a preferred embodiment, it will be understood by those skilled in the art that various changes in form and detail may be without departing from the spirit and scope of the present invention.

What is claimed is:

1. A lamination type stretch sensor, comprising:
    a first elastic insulation layer, including a first connecting portion and a first stretching end portion integrally extended from the first connecting portion along a first direction;
    a first elastic conductive layer, located on the first connecting portion, comprising:
    a plurality of first coupling sections, spaced apart with each other; and
    a plurality of first connecting section, located between these first coupling sections for electrically connecting these first coupling sections;
    an elastic dielectric layer, located on the first connecting portion, and covering the first elastic conductive layer;
    a second elastic conductive layer, located on the elastic dielectric layer and separated from the first elastic conductive layer by the elastic dielectric layer, and the second elastic conductive layer comprising:
    a plurality of second coupling sections, corresponding to the first coupling sections and being spaced apart with each other, and a total initial coupling capacitance being generated between these first coupling sections and the second coupling sections; and
    a plurality of second connecting sections, located between these second coupling sections for electrically connecting these second coupling sections; and
    a second elastic insulation layer, having a second connecting portion and a second stretching end portion, the second connecting portion being located on the elastic dielectric layer and covering the second elastic conductive layer, and the second stretching end portion being integrally extended from the second connecting portion along a second direction which is opposite to the first direction;
    wherein, when the first stretching end portion and the second stretching end portion are stretched along the first direction and the second direction respectively to stretch the lamination type stretch sensor to a stretched length, these first coupling sections and these second coupling sections move along the first direction and the second direction respectively so as to form a total stretched coupling capacitance corresponding to the stretched length, and the total stretched coupling capacitance is smaller than the total initial coupling capacitance;
    wherein the first stretching end portion and the second stretching end portion are extended away from the elastic dielectric layer;
    wherein the first stretching end portion and the second stretching end portion are utilized for stretching the lamination type stretch sensor.

2. The lamination type stretch sensor of claim 1, wherein these first connecting sections are alternatively located on both sides of these first coupling sections, these second connecting sections are alternatively located on both sides of these second coupling sections, and these first connecting sections and these second connecting sections are arrayed alternatively.

3. The lamination type stretch sensor of claim 1, wherein the elastic dielectric layer is composed of materials comprising an elastic resin and a dielectric material.

4. The lamination type stretch sensor of claim 3, wherein the elastic resin is composed of materials at least comprising Monovinyl terminated polydimethylsiloxane Vinyl modified Q silica resin, and Methylhydrosiloxane-dimethylsiloxane copolymer, trimethylsiloxane terminated.

5. The lamination type stretch sensor of claim 3, wherein the dielectric material is composed of materials at least comprising a Sr1-xCaxTiO3 compound, a Sr1-yBayTiO3 compound, or a BaTiO3 compound, wherein $0.1 \leq x \leq 0.9$ and $0.1 \leq y \leq 0.9$, such that dielectric constant (K) of the dielectric material is ranged between 14 and 8000, and dielectric constant (K) of the elastic dielectric layer is ranged between 4.85 and 300.

6. The lamination type stretch sensor of claim 5, wherein the dielectric material is composed of the Sr1-xCaxTiO3 compound, and the dielectric constant of the dielectric material is ranged between 14 and 30.

7. The lamination type stretch sensor of claim 6, wherein the elastic dielectric layer comprises 10 wt % to 20 wt % the dielectric material.

8. The lamination type stretch sensor of claim 1, wherein these first coupling sections are spaced apart with each other in a first interval, each of these first coupling sections has a first width, and a ratio of the first width and the first interval is 1.67.

9. The lamination type stretch sensor of claim 8, wherein these second coupling sections are spaced apart with each other in a second interval, each of these second coupling sections has a second width, and a ratio of the second width and the second interval is 1.67.

10. The lamination type stretch sensor of claim 9, wherein the second interval equals to the first interval.

* * * * *